US012654289B2

(12) United States Patent
Frye, Jr.

(10) Patent No.: US 12,654,289 B2
(45) Date of Patent: Jun. 16, 2026

(54) RATCHET TOOL WITH SWITCH SLEEVE

(71) Applicant: Harbor Freight Tools USA, Inc., Calabasas, CA (US)

(72) Inventor: Oaty Anthony Frye, Jr., Middleton, CT (US)

(73) Assignee: Harbor Freight Tools USA, Inc., Calabasas, CA (US)

( * ) Notice: Subject to any disclaimer, the term of this patent is extended or adjusted under 35 U.S.C. 154(b) by 629 days.

(21) Appl. No.: 18/097,212

(22) Filed: Jan. 14, 2023

(65) Prior Publication Data

US 2024/0238947 A1 Jul. 18, 2024

(51) Int. Cl.
*B25B 13/46* (2006.01)

(52) U.S. Cl.
CPC .................................. *B25B 13/463* (2013.01)

(58) Field of Classification Search
CPC ............................ B25B 13/463; B25B 13/467
USPC ........................................................ 81/63, 1
See application file for complete search history.

(56) References Cited

U.S. PATENT DOCUMENTS 5,231,901 A * 8/1993 Putney .................. B25B 21/004 81/57.39
6,805,028 B1 * 10/2004 Chang .................. B25B 13/463 192/38
7,140,273 B2 * 11/2006 Palmowski .......... H02G 1/1265 81/9.51
7,299,720 B1 11/2007 Schultz et al.
7,938,043 B2 5/2011 Hu
8,499,666 B2 8/2013 Hopper et al.
8,806,986 B2 * 8/2014 Chen ..................... B25B 13/463 81/62
8,833,208 B2 9/2014 Arnold et al.
9,038,507 B2 5/2015 Thompson et al.
2017/0361430 A1 * 12/2017 Mitcheltree ........... B25B 13/468
2019/0134789 A1 5/2019 Lin

* cited by examiner

*Primary Examiner* — Hadi Shakeri
(74) *Attorney, Agent, or Firm* — McAndrews, Held & Malloy, Ltd.

(57) ABSTRACT

A reversible ratchet tool that permits a user to selectively determine the direction in which torque is applied to a work piece is disclosed including a sleeve that surrounds a switch. The sleeve includes at least one anchor for anchoring to a switch-sleeve cavity of a ratchet head whereby the sleeve aligns and limits the rotation of the switch disposed within a switch pocket of the sleeve. The switch includes a first ledge, a second ledge, and a biasing member housed within. A pawl is at least partially disposed between the first ledge and the second ledge such that the switch does not interfere with the engagement of the biasing member, pawl, and a ratchet gear. This arrangement reduces and/or eliminates failure of the engagement between the pawl and the ratchet gear. This arrangement also maintains vertical alignment of the internal components while limiting vertical movement of the internal components disposed within the ratchet head.

12 Claims, 11 Drawing Sheets

RATCHET TOOL WITH SWITCH SLEEVE

BACKGROUND

The present disclosure relates generally to a ratchet sleeve for use in a ratchet tool. Ratchet tools include for example ratchet wrenches and torque wrenches. Such ratchet tools typically include reversible gears, which are capable of applying torque in both a clockwise and counterclockwise direction to tighten or loosen fasteners.

Ratchet tools generally include a cylindrical gear that may engage with a work piece, a pawl to engage the gear, a switch to control the relative orientation of the pawl with respect to the gear, and a biasing member disposed within the switch, engaging with the pawl to bias the pawl towards the gear. The application of torque to a fastener relies on the mechanical engagement of the switch and the resulting interaction between the biasing member, the pawl, and the gear.

In traditional ratchet tools, the switch is positioned and stabilized solely by the machined surfaces in a head of the ratchet tool or on surfaces of the pawl. Such ratchet tools may experience failure of the pawl-to-gear engagement, due to instability or shifting of the switch resulting from the high dimensional variations of such components and/or misalignment between structures. For example, some of these switch configurations rely on a biasing member to stabilize the switch by biasing (or pushing) the switch against a machined surface of the head. Other switch configurations rely on a biasing member to stabilize the switch by biasing (or pushing) the switch against a surface of the pawl. Such configurations may lead to instability of the switch, resulting in the switch to inadvertently change the direction of the gear or causing the pawl and the gear to jam or wear down due to misalignment.

In some ratchet tools, the switch includes a lip that is positioned between a cover plate and a ledge formed in the head of ratchet tool, directly below the cover plate. These ratchet tools may additionally include a ledge formed on the pawl on which the switch lip may at least partially rest. While such configurations may help to prevent, or limit, vertical movement of the switch (z-axis, relative to the drive axis of the gear), these configurations still rely on biasing members or a dynamic component (the pawl) to stabilize the switch for horizontal (x-axis, relative to the handle axis) or lateral (y-axis, relative to the ratchet head) movement. As a result, because of the potential of shifting or instability of the switch within the ratchet head, there may be an increased likelihood of gear failure or wear.

Other ratchet tools may include an additional component, such as a spacer, to help stabilize the pawl or switch. However, such ratchet tools generally arrange the spacer in a stacked configuration between the switch and a cover plate. These configurations may result in additional play and instability between the internal components due to differences in manufacturing tolerances and the stacked configuration of the internal components of the ratchet tool. This instability of the switch may result in a less favorable pawl-to-gear engagement, which could result in the gear wearing down.

Yet other ratchet tools may aim to stabilize the switch by positioning it primarily in a separate rear cavity connected only to the main front cavity by a small opening. This allows the switch biasing member to engage with the pawl in the front cavity. Such ratchet tools typically require assembly of the internal components from both a front side and a rear side of the ratchet head. For example, a switch is inserted into the rear from the rear side while the other internal components including the pawl, retaining member, and ratchet gear are assembled on the front side. These types of assemblies tend to lead to an increase in assembly time.

It is therefore advantageous to improve the reliability of a ratchet tool by stabilizing the switch by reducing or eliminating shifting along the x, y, or z-axis and eliminating reliance on biasing members and/or dynamic components such as the gear or the pawl to position and stabilize the switch, while also improving manufacturability.

SUMMARY

A ratchet tool with a switch sleeve is disclosed, as illustrated by and described in connection with the figures of the present disclosure, and as set forth in the claims.

Specifically, disclosed is an example reversible ratchet tool. The reversible ratchet tool includes a ratchet head having a front side and a rear side. The ratchet head includes a ratchet assembly cavity. The ratchet head further includes a switch-sleeve cavity that overlaps with the ratchet assembly cavity. The ratchet head further includes a switch aperture extending from the ratchet head rear side to the switch-sleeve cavity. The ratchet head further includes a ratchet assembly disposed in the ratchet assembly cavity. The ratchet assembly includes a ratchet gear including a drive member for transmitting torque to a work piece. The ratchet assembly further includes a pawl operable to selectively engage with the ratchet gear. The ratchet head further includes a sleeve disposed in the switch-sleeve cavity. The sleeve includes a sleeve body and a switch pocket. The sleeve and the switch-sleeve cavity are configured to prevent rotation of the sleeve within the switch-sleeve cavity. The ratchet head further includes a switch rotatably disposed through the switch aperture and within the switch pocket of the sleeve. The switch includes a biasing member operable to engage the pawl such that the biasing member urges the pawl against the ratchet gear. The ratchet head further includes a cover plate attachable to the front side of the ratchet head for closing the ratchet assembly cavity and switch-sleeve cavity.

In one example, at least one anchor protrudes from the sleeve body and is operable to engage with at least one anchor pocket disposed within the switch-sleeve cavity such that the sleeve is anchored to the ratchet head. In another example, the biasing member comprises a spring and a pin, the spring and pin being at least partially disposed within the switch. In another example, the pawl comprises a front surface and a rear surface, and the front surface includes a plurality of pawl teeth operable to selectively engage with the ratchet gear.

In one example, the rear surface of the pawl includes a recessed portion, and the recessed portion provides a space to allow rotation of the switch. In another example, the switch includes a switch body. The switch further includes a first ledge extending away from the switch body on one side of the biasing member. The first ledge has a first arc length. The switch further includes a second ledge extending away from the switch body on an opposite side of the biasing member. The second ledge has a second arc length. In another example, the first arc length of the first ledge is greater than the second arc length of the second ledge.

In one example, the sleeve includes a first surface operable to engage with either the first ledge or the second ledge of the switch to align the switch in a first position. The sleeve further includes a second surface operable to engage with either the first ledge or the second ledge of the switch to align the switch in a second position. In another example, the pawl is at least partially disposed between the first ledge and the second ledge of the switch to limit vertical movement of the pawl relative to the front side and the rear side of the ratchet head. In an additional example, the cover plate includes an aperture operable to receive the drive member of the ratchet gear projecting out of the ratchet assembly cavity.

Also disclosed is another example reversible ratchet tool. The ratchet tool includes a ratchet head having a front side and a rear side. The ratchet head includes a ratchet assembly cavity having a first depth relative to the front side of the ratchet head. The ratchet head further includes a switch-sleeve cavity that overlaps with the ratchet assembly cavity. The switch-sleeve cavity includes a second depth relative to the front side of the ratchet head. The second depth is greater than the first depth. The switch-sleeve cavity further includes a bottom surface positioned proximate the rear side of the ratchet head. The ratchet head further includes a switch aperture that extends from the ratchet head rear side to the switch-sleeve cavity. The ratchet head further includes a ratchet assembly disposed in the ratchet assembly cavity. The ratchet assembly includes a ratchet gear including a drive member for transmitting torque to a work piece. The ratchet assembly further includes a pawl operable to selectively engage with the ratchet gear. The ratchet head further includes a sleeve disposed in the switch-sleeve cavity. The sleeve includes a sleeve body and a switch pocket. The ratchet head further includes a switch rotatably disposed through the switch aperture and within the switch pocket. The rotation of the switch is constrained to a rotational range by the sleeve. The ratchet head further includes a biasing member at least partially disposed within the switch and operable to engage the pawl such that the biasing member urges the pawl against the ratchet gear. The ratchet head further includes a cover plate attachable to the front side of the ratchet head for closing the ratchet assembly cavity and switch-sleeve cavity. The cover plate and the bottom surface of the switch-sleeve cavity maintain a vertical alignment of the switch relative to the front side and the rear side of the ratchet head.

In one example, at least one anchor protrudes from the sleeve body and is operable to engage with at least one anchor pocket disposed within the switch sleeve cavity such that the sleeve is anchored to the ratchet head. In another example, the switch includes a switch body and at least one ledge extending away from the switch body on one side of the biasing member. In another example, the pawl is at least partially disposed between the at least one ledge and a bottom surface of the ratchet assembly cavity to limit vertical movement of the pawl relative to the front side and the rear side of the ratchet head.

In one example, the sleeve includes a first surface operable to engage with either the at least one ledge of the switch to align the switch in a first position. The sleeve further includes a second surface operable to engage with either the at least one ledge of the switch to align the switch in a second position. In another example, the pawl includes a front surface and a rear surface, and the front surface includes a plurality of pawl teeth operable to selectively engage with the ratchet gear. In an additional example, the rear surface of the pawl includes a recessed portion, and the recessed portion provides a space to allow rotation of the switch.

Also disclosed is an example sleeve for a ratchet tool. The sleeve includes a sleeve body having a partially circumferential shape and operable to at least partially surround a switch. The sleeve body includes at least one anchor. The at least one anchor is operable to engage with an inner surface of a cavity within a ratchet head of the ratchet tool such that the sleeve is anchored to the ratchet head. The sleeve body further includes a first surface operable to align the switch in a first position. The sleeve body further includes a second surface operable to align the switch in a second position. The sleeve and the switch are disposed within the cavity.

In one example, the sleeve body includes a first anchor protruding from one side of the sleeve body and a second anchor protruding from an opposing side of the sleeve body. In another example, the first surface comprises a first upper portion and a first lower portion, the first lower portion protruding beyond the first upper portion. The second surface comprises a second upper portion and a second lower portion, the second lower portion protruding beyond the second upper portion. In another example, the switch includes a switch body. The switch further includes a first ledge extending away from the switch body. The first ledge has a first arc length. The switch further includes a second ledge extending away from the switch body. The second ledge has a second arc length. The first arc length is greater than the second arc length.

In one example, the first upper portion of the sleeve is operable to engage with the first ledge and the first lower portion of the sleeve is operable to engage with the second ledge of the switch to align the switch in the first position. The second upper portion of the sleeve is operable to engage with the first ledge and the second lower portion of the sleeve is operable to engage with the second ledge of the switch to align the switch in the second position

Figure 1:
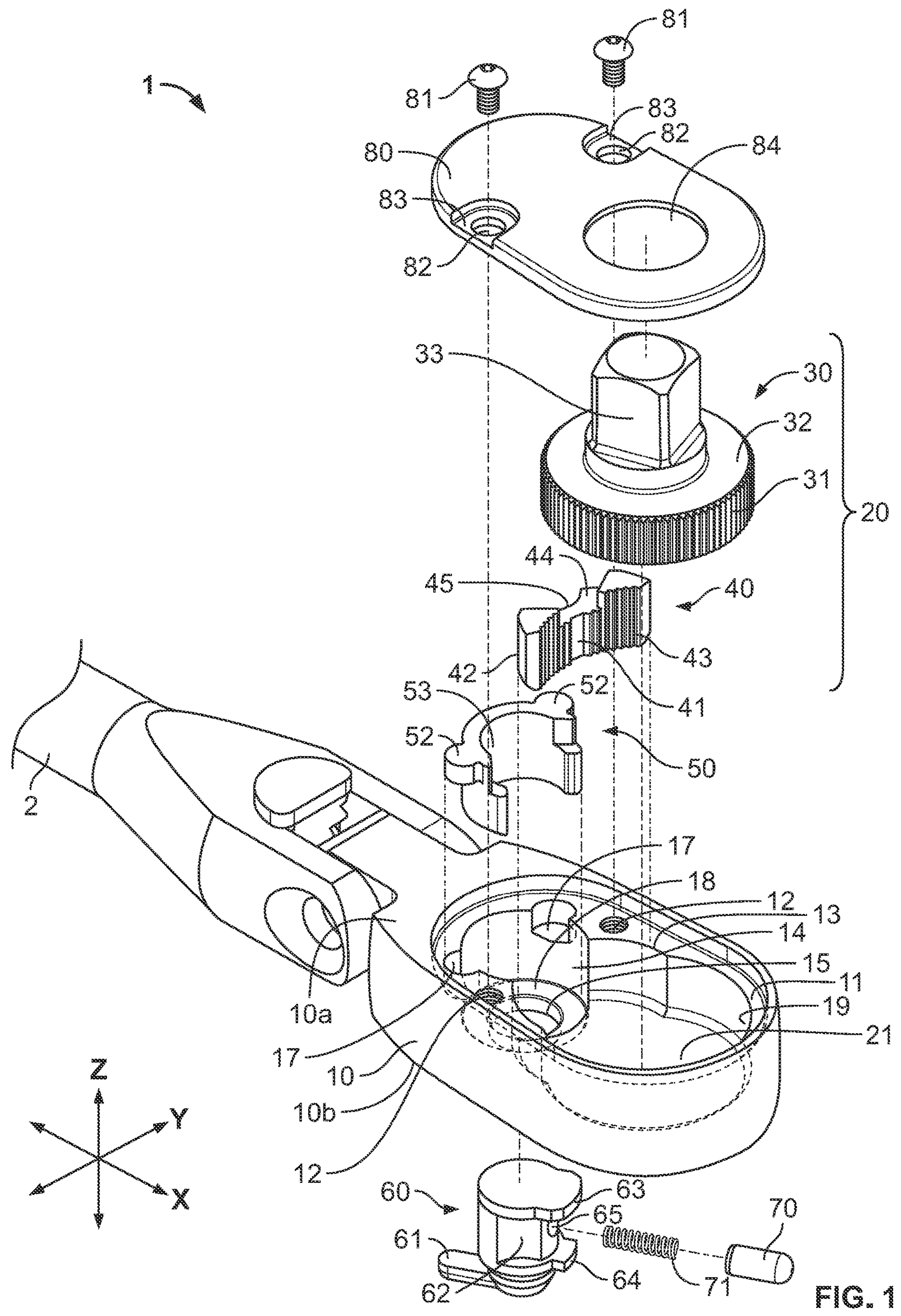
FIG. 1 illustrates an exploded perspective view of a ratchet head of a reversible ratchet tool according to one aspect of the present disclosure.

The foregoing summary, as well as the following detailed description of certain features of the present application, are better understood when read in conjunction with the appended drawings. For the purposes of illustration, certain features are shown in the drawings. It should be understood, however, that the claims are not limited to the arrangements shown in the attached drawings. Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of applications comprising one or more embodiments of the disclosure. As such, the drawings are not meant to include all conventional features known by those of ordinary skill in the art to be required for the practice of the embodiments disclosed herein.

DETAILED DESCRIPTION

The present disclosure relates to a reversible ratchet tool that permits a user to selectively determine the direction in which torque is applied to a work piece (not shown). Amongst other factors, a reliable ratchet tool requires the stabile yet dynamic engagement of the tool's internal and/or external components. A reversible ratchet tool 1 is shown in the exploded view of FIG. 1, Also shown in FIG. 1 are x, y, and z-axis to assist in the description of the various movements and relationships of the internal components of the ratchet tool. The reversible ratchet tool 1 of the present disclosure performs optimally when the respective engagements between a ratchet gear 30 and a pawl 40, and between the pawl 40 and a switch 60 are stable without any shifting, vertical movement along the z-axis, or undesirable rotation about the x-axis or the y-axis of these components within a ratchet head 10. The reversible ratchet tool 1 of the present disclosure further includes a sleeve 50 disposed in a switch-sleeve cavity 14 and positioned on a bottom surface 18 of the switch-sleeve cavity 14. The sleeve 50 functions to stabilize the switch 60 within the ratchet head 10 and specifically within the switch-sleeve cavity 14.

As shown in FIG. 1, the reversible ratchet tool 1 includes a handle 2 attached to the ratchet head 10. The ratchet head 10 of the illustrated embodiment includes a conventional flex head. It will be understood that the reversible ratchet tool may alternatively include any other head configuration such as a conventional fixed head. The ratchet head 10 has a front side 10*a* and a rear side 10*b*. The front side 10*a* includes a cover plate cavity 11, a ratchet assembly cavity 13, and a switch-sleeve cavity 14 for receiving internal and/or external components. The rear side 10*b* includes a switch aperture 15 that extends from the rear side 10*b* to the switch-sleeve cavity 14. The switch aperture 15 may be larger or smaller than shown to facilitate assembly of the internal and/or external components and to improve stability of the internal components.

The ratchet assembly cavity 13 is formed at a first depth along the x-axis relative to the front side 10*a* of the ratchet head 10. As shown in FIG. 1, the ratchet assembly cavity 13 defines one or more sidewalls 19 for receiving a ratchet assembly 20. The ratchet assembly 20 includes a ratchet gear 30 and a pawl 40. The ratchet assembly cavity 13 further defines one or more sidewalls 19 that conform to a variety of shapes and sizes of both a ratchet gear and a pawl.

The ratchet gear 30 has gear teeth 31 disposed on a circumferential surface 32 that selectively engage with the pawl 40. As shown in FIG. 1, the gear teeth 31 have triangular peaks with triangular grooves that run vertically. The ratchet gear 30 further includes a drive member 33 centrally disposed on the ratchet gear 30. The drive member 33 is operable to engage with a socket, fastener, or other tool such that torque is transmitted through the drive member 33 and onto a work piece (not shown). The drive member 33 has a square shape, but may also have a rectangular or other shape. The drive member may optionally include a ball detent operable to engage with a conventional socket.

Figure 2:
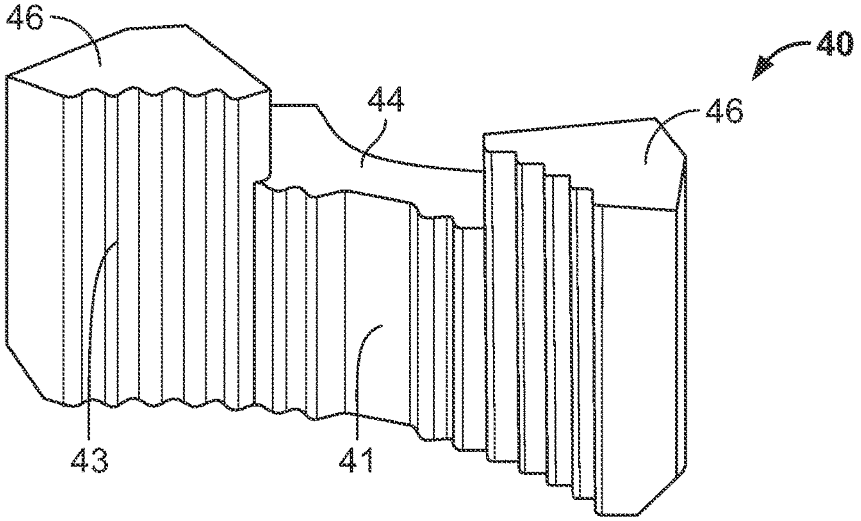
FIG. 2 illustrates a top-front perspective view of a pawl according to one aspect of the present disclosure.
Figure 3:
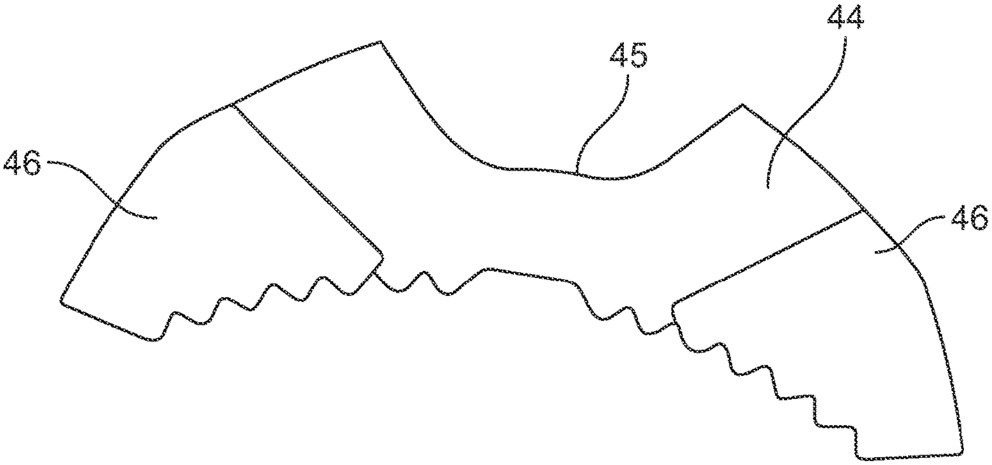
FIG. 3 illustrates a top plan view of a pawl according to one aspect of the present disclosure.
Figure 4:
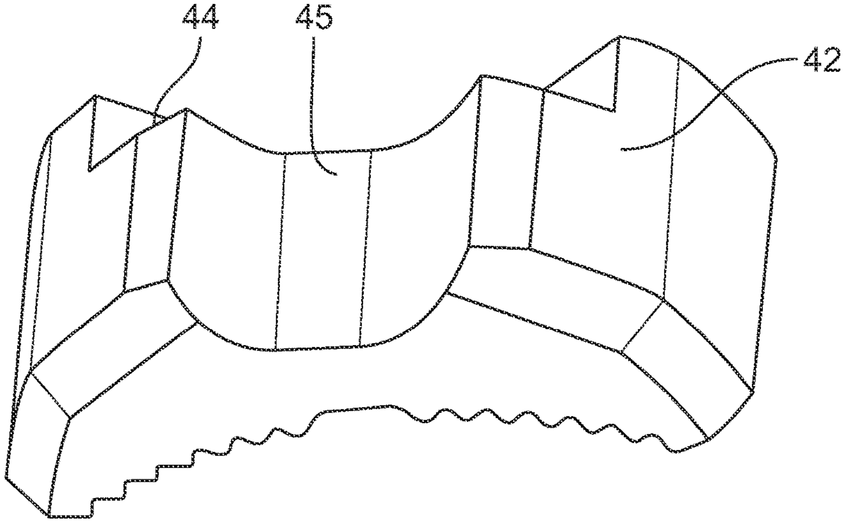
FIG. 4 illustrates a bottom-rear perspective view of a pawl according to one aspect of the present disclosure.

As shown in detail in FIGS. 2-4, the pawl 40 includes a front surface 41 and a rear surface 42. The front surface 41 of the pawl 40 includes a plurality of pawl teeth 43 operable to selectively engage with the gear teeth 31 of the ratchet gear 30 in multiple positions. The pawl teeth 43 engage the gear teeth 31 in order to limit rotation of the ratchet gear 30 to one direction about a z-axis of the ratchet gear 30. In one embodiment, the body of the pawl 40 has a rounded shape that conforms to a portion of the circumferential surface 32 of the ratchet gear 30. It is to be understood that the present disclosure contemplates a pawl 40 that may conform to more or less of the circumferential surface 32 of the ratchet gear 30 than specifically shown in the figures. The rear surface 42 of the pawl includes a recessed portion 44 and a notch 45 that engages with a pin 70 biased towards the pawl 40 by a biasing member 71, for example a spring, disposed within a switch 60. In certain embodiments, the rear surface 42 of the pawl 40 includes a recessed portion 44 and a notch 45. The pawl 40 may also include at least one or more extended portions 46 disposed on opposite sides of the recessed portion 44.

Figure 5:
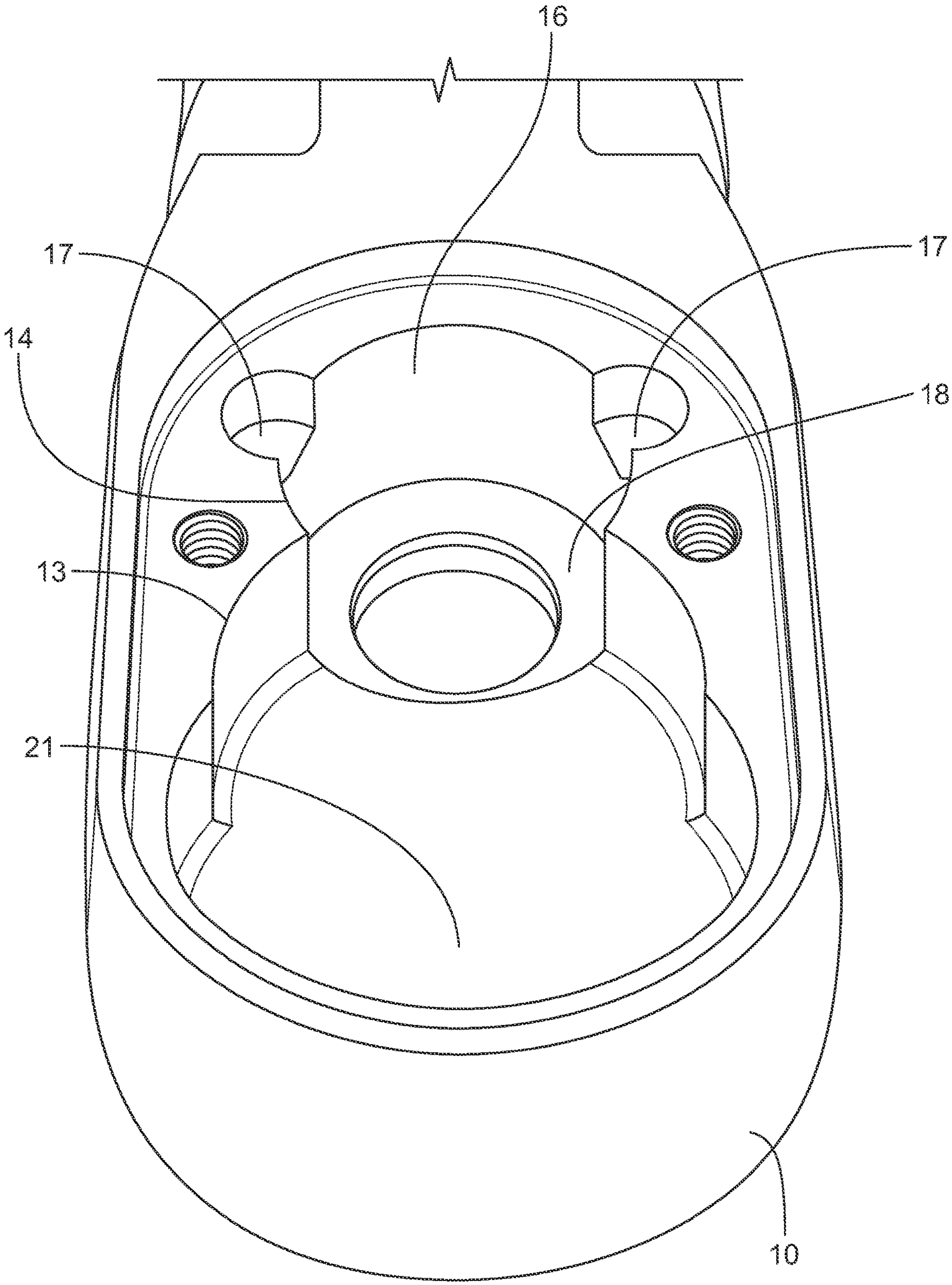
FIG. 5 illustrates a top perspective view of a front side of a ratchet head of a reversible ratchet tool, showing a cover plate cavity, a ratchet assembly cavity, and a switch-sleeve cavity according to one aspect of the present disclosure.

FIG. 1 and FIG. 5 show the switch-sleeve cavity 14 positioned adjacent to the ratchet assembly cavity 13. Specifically, the switch-sleeve cavity 14 overlaps with, or conjoins, the ratchet assembly cavity 13. The switch-sleeve cavity 14 receives at least a portion of each of a sleeve 50 and a switch 60. The switch-sleeve cavity 14 includes a bottom surface 18 formed at a second depth (along the z-axis) below the first depth of the ratchet assembly cavity 13 and positioned proximate the rear side 10*b* of the ratchet head. The depth of the bottom surface 18 is not limited to a specific depth, but may be modified to receive various geometries of a switch, a sleeve, and/or other internal components of a reversible ratchet tool. As shown in the figures, the bottom surface 18 is circular but may have alternative shapes for receiving various geometries of a sleeve and a switch. Alternatively, the switch-sleeve cavity may include a bottom surface that is co-planar with a bottom surface 21 of the ratchet assembly cavity 13.

Figure 6:
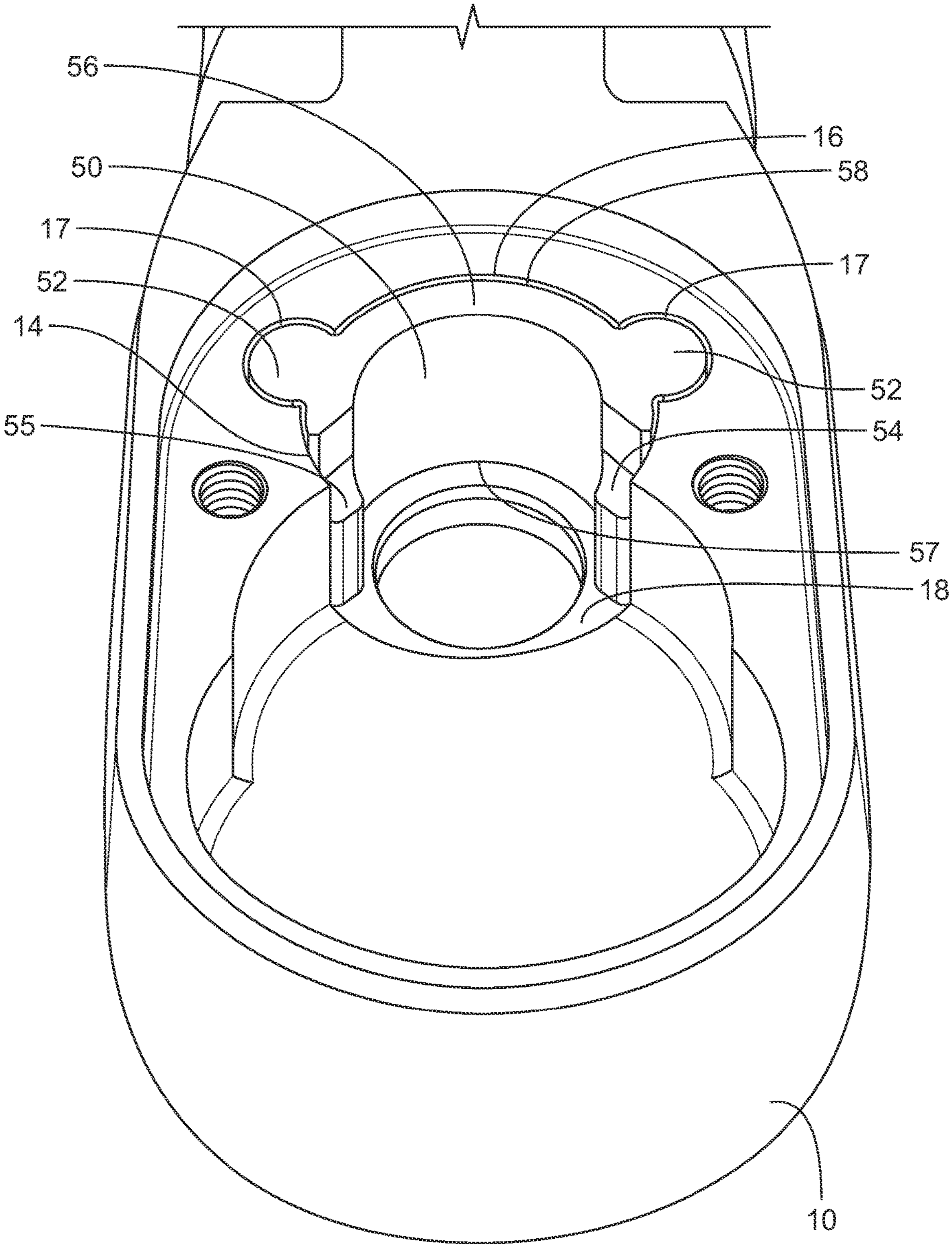
FIG. 6 illustrates a top perspective view of a front side of a ratchet head of a reversible ratchet tool, showing a sleeve positioned in the switch-sleeve cavity according to one aspect of the present disclosure.

As shown in FIG. 6, the switch-sleeve cavity 14 and sleeve 50 are each configured such that the sleeve 50 is closely received within the switch-sleeve cavity 14. The switch-sleeve cavity 14 and sleeve 50 are keyed such that the sleeve 50 is prevented from rotating within the switch-sleeve cavity 14. In the preferred embodiment, the keyed configuration includes at least one anchor pocket 17 defined by the switch-sleeve cavity 14 and at least one cooperating anchor

52 defined by the sleeve 50 and configured to be closely received within the at least one anchor pocket 17. In the illustrated embodiment, the switch-sleeve cavity 14 includes two anchor pockets 17 disposed in the sleeve wall 16 near the cover plate cavity 11 and proximate the front side 10*a* of the ratchet head 10, and configured to receive corresponding anchors 52 of the sleeve 50. In another embodiment, the switch-sleeve cavity may include anchor pockets disposed near the bottom surface. The present disclosure contemplates that the switch-sleeve cavity 14 may include at least one anchor pocket disposed anywhere along the sleeve wall 16.

Figure 7:
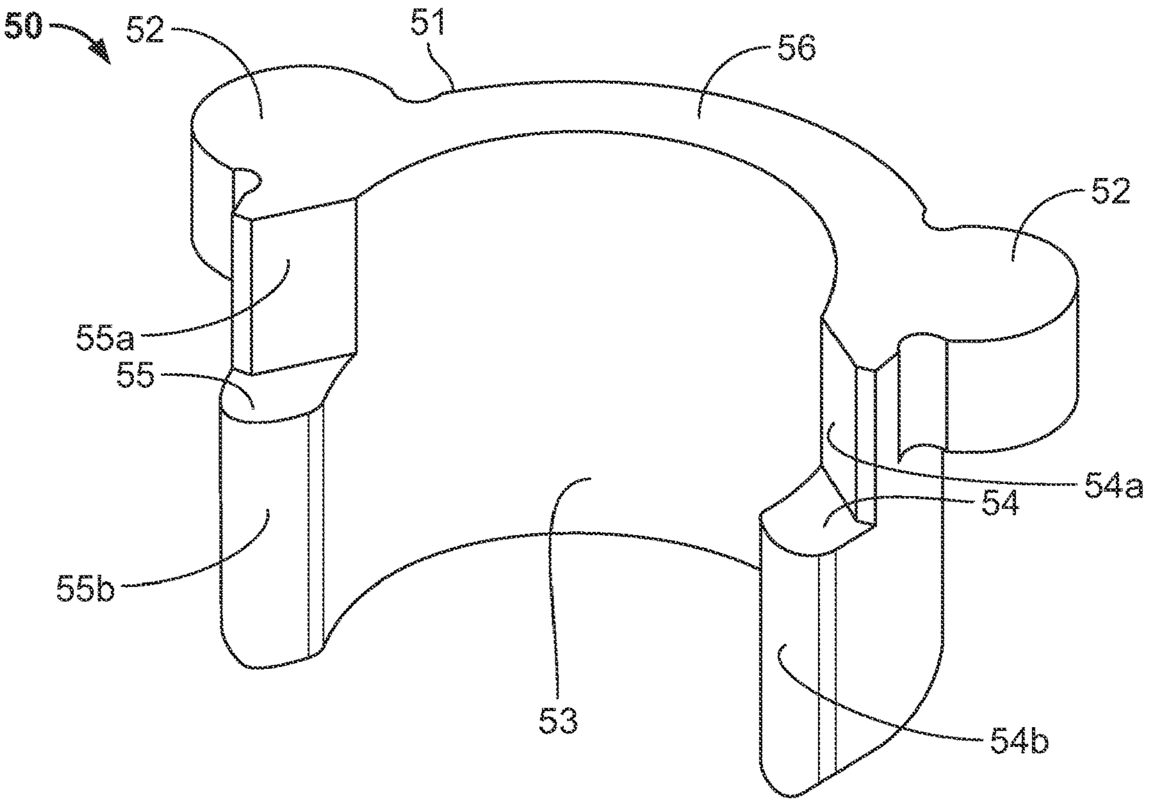
FIG. 7 illustrates a top-front perspective view of a sleeve according to one aspect of the present disclosure.
Figure 8:
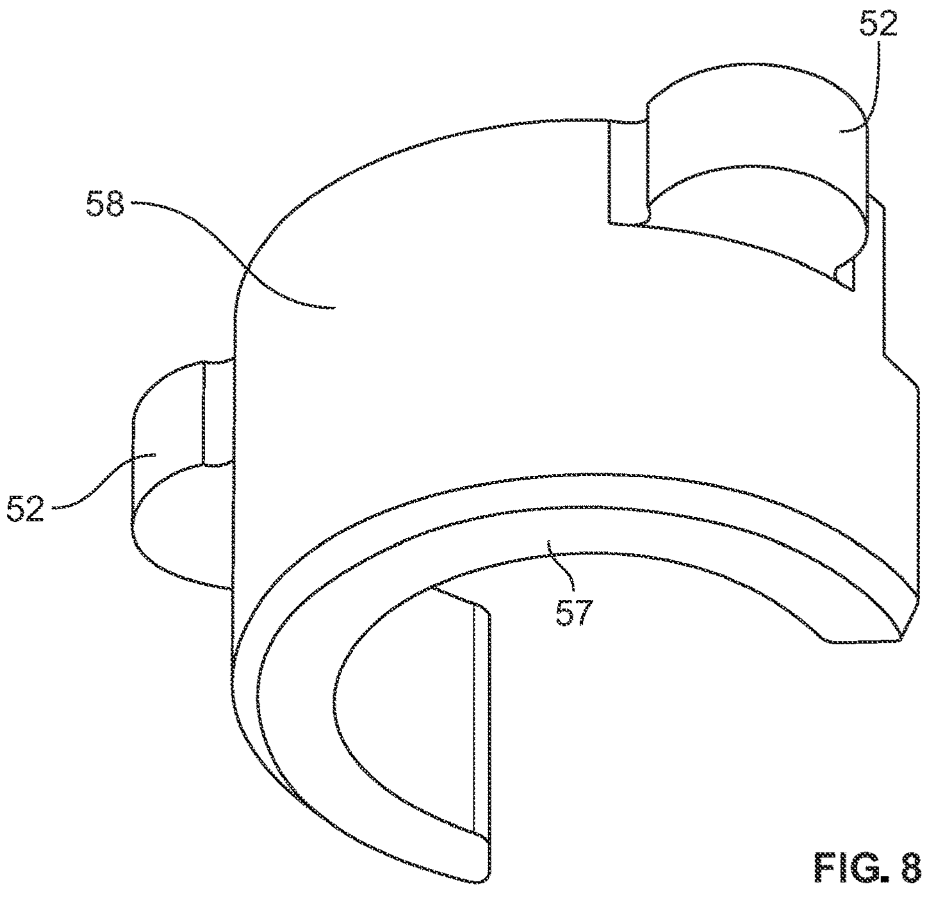
FIG. 8 illustrates a bottom-rear perspective view of a sleeve according to another aspect of the present disclosure.

The sleeve 50 includes a sleeve body 51 and at least one anchor 52 protruding from the sleeve body 51. In the illustrated embodiment of FIGS. 7 and 8, one anchor 52 protrudes from one side of the sleeve body 51 and another anchor 52 protrudes from an opposite side of the sleeve body 51. The anchors 52 of the sleeve 50 are operable to engage with the anchor pockets 17 of the switch-sleeve cavity 14, or, alternatively, with any inner surface of a cavity within a ratchet head. When engaged, the anchors 52 of the sleeve 50 anchor or lock the sleeve 50 to the ratchet head 10 and within the switch-sleeve cavity 14, such that the sleeve 50 does not experience lateral or rotational movement along the x, y, or z-axis during use. As shown in FIG. 6, the shape of at least one or more anchors 52 is configured to fit within the shape of at least one anchor pocket 17 such that an anchor 52 has a tight-fit engagement or locking function with an anchor pocket 17. Any corresponding geometries of anchor(s) 52 and anchor pocket(s) 17 are contemplated that provide for stability of the sleeve 50 within the switch-sleeve cavity 14.

As shown in FIGS. 7-10, the sleeve body 51 of the sleeve 50 has at least a partially circumferential shape that at least partially surrounds a switch 60. Similarly, the sleeve 50 includes a switch pocket 53 that receives and/or at least partially surrounds a switch 60, thereby conforming to the shape of the switch 60. The sleeve 50 further includes a top portion 56, a bottom portion 57, and a rear portion 58. When the sleeve 50 is anchored within the switch-sleeve cavity 14, the rear portion 58 of the sleeve 50 contacts the sleeve wall 16 of the switch-sleeve cavity 14 and the bottom portion 57 of the sleeve 50 rests on the bottom surface 18 of the switch-sleeve cavity 14. Likewise, sleeve wall 16 and the bottom surface 18 conform to the shape of the sleeve 50. Moreover, as shown for example in FIG. 10, the sleeve 50 may be dimensioned such that the top portion 56 of the sleeve 50 is substantially co-planar with the top plane of the cover plate cavity 11. In such an embodiment, when a cover plate 80 is secured within the cover plate cavity 11, it contacts the top portion 56 of the sleeve 50 to further stabilize the sleeve 50 within the switch-sleeve cavity 14. As a result, the sleeve 50 is stabilized by the bottom surface 18 of the switch-sleeve cavity, the sleeve wall 16 of the switch-sleeve cavity 14, the engagement of the anchors 52 with the anchor pockets 17, and the cover plate 80.

Referring again to FIG. 7, the first surface 54 of the sleeve further includes a first upper portion 54*a* and a first lower portion 54*b*. The first lower portion 54*b* protrudes beyond the first upper portion 54*a*. In addition, the second surface 55 of the sleeve further includes a second upper portion 55*a* and a second lower portion 55*b*. The second lower portion 55*b* may protrude beyond the second upper portion 55*a*. As will be discussed in further detail below, the first surface 54 and second surface 55 may contribute to stabilizing the switch by limiting the rotation of the switch about the z-axis when the switch is disposed within the sleeve 50 and switch-sleeve cavity 14.

Figure 9:
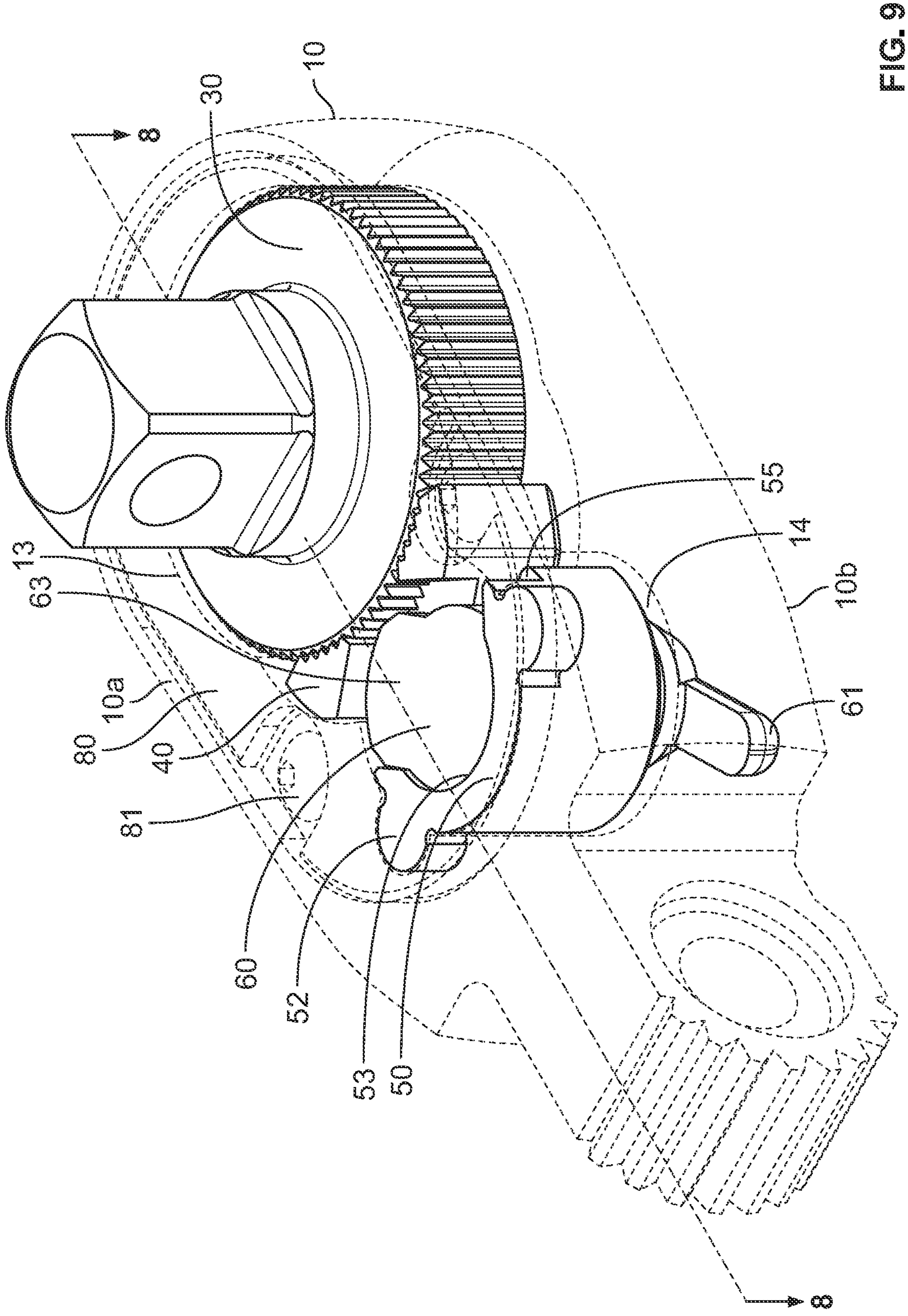
FIG. 9 illustrates a perspective view of an assembled reversible ratchet tool in a first position according to another aspect of the present disclosure.
Figure 10:
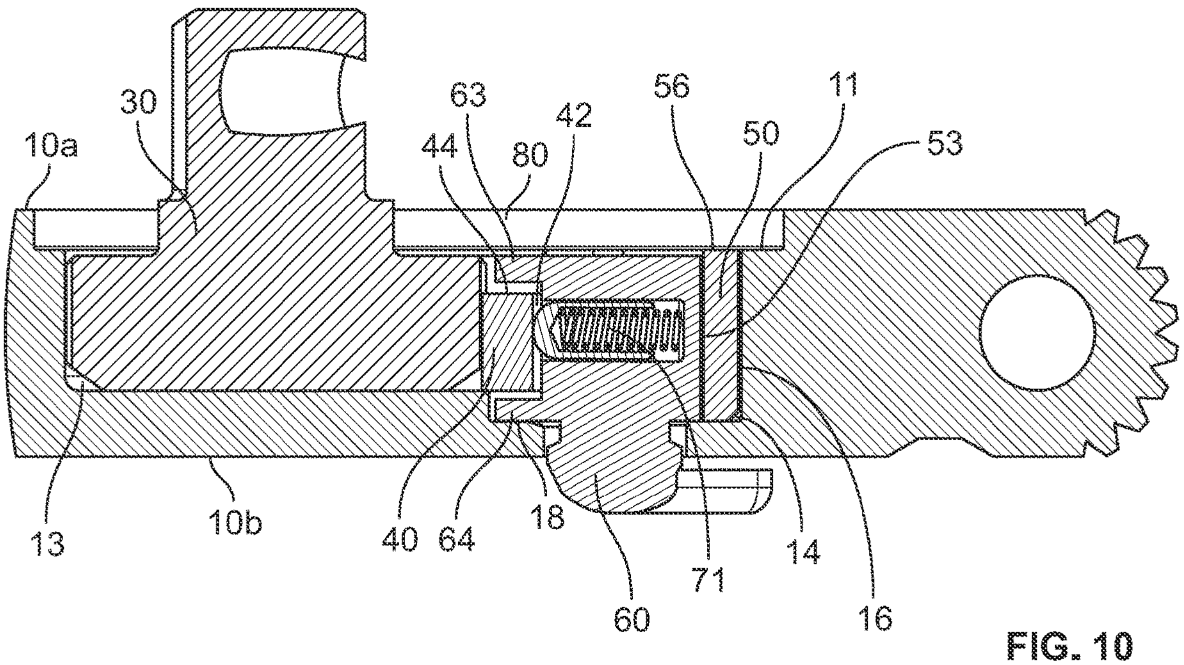
FIG. 10 illustrates a cross-sectional view of an assembled reversible ratchet tool according to multiple aspects of the present disclosure taken along lines 8-8 of FIG. 9.

As shown in FIGS. 1, 9-10, a switch 60 is rotatably disposed through the switch aperture 15 and positioned within the switch pocket 53 of the sleeve 50. A user may activate the switch 60 via a switch lever 61 positioned on the rear side 10*b* of the ratchet head 10 and may rotate the switch 60 between a first position and a second position. Referring again to FIG. 1, the switch 60 defines a bore 65 configured to receive a biasing member 71 and to partially receive a pin 70. In the illustrated embodiment, the biasing member 71 is a spring. The biasing member 71 uses elastic potential energy to push the pin 70 into engagement with the rear surface 42 of the pawl 40, or more specifically, with the notch 45 on the pawl 40, thereby urging the pawl 40 against the ratchet gear 30.

Figure 11:
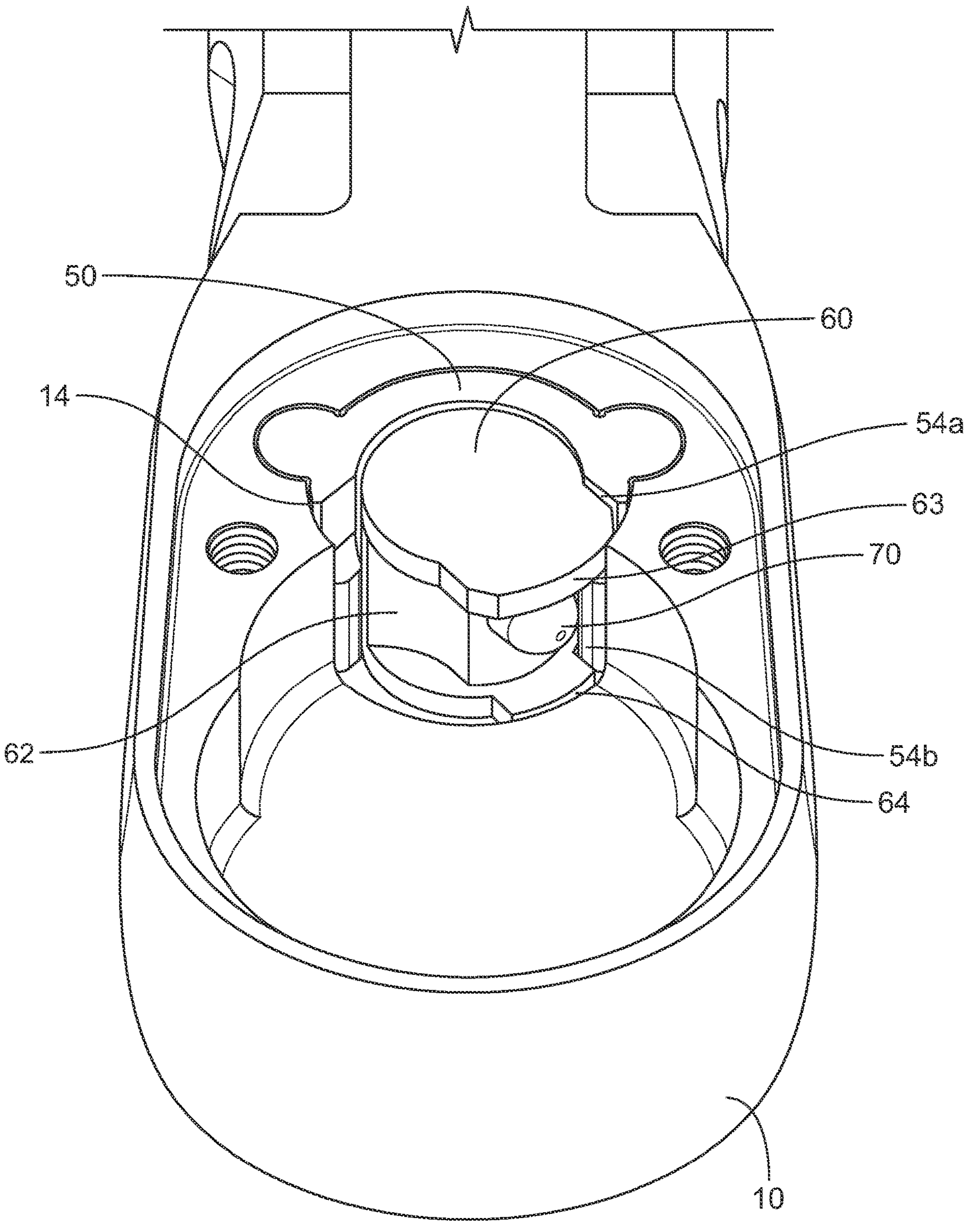
FIG. 11 illustrates a top perspective view of a front side of a ratchet head of a reversible ratchet tool, showing a sleeve, a pin, and a switch in a first position according to one aspect of the present disclosure.
Figure 12:
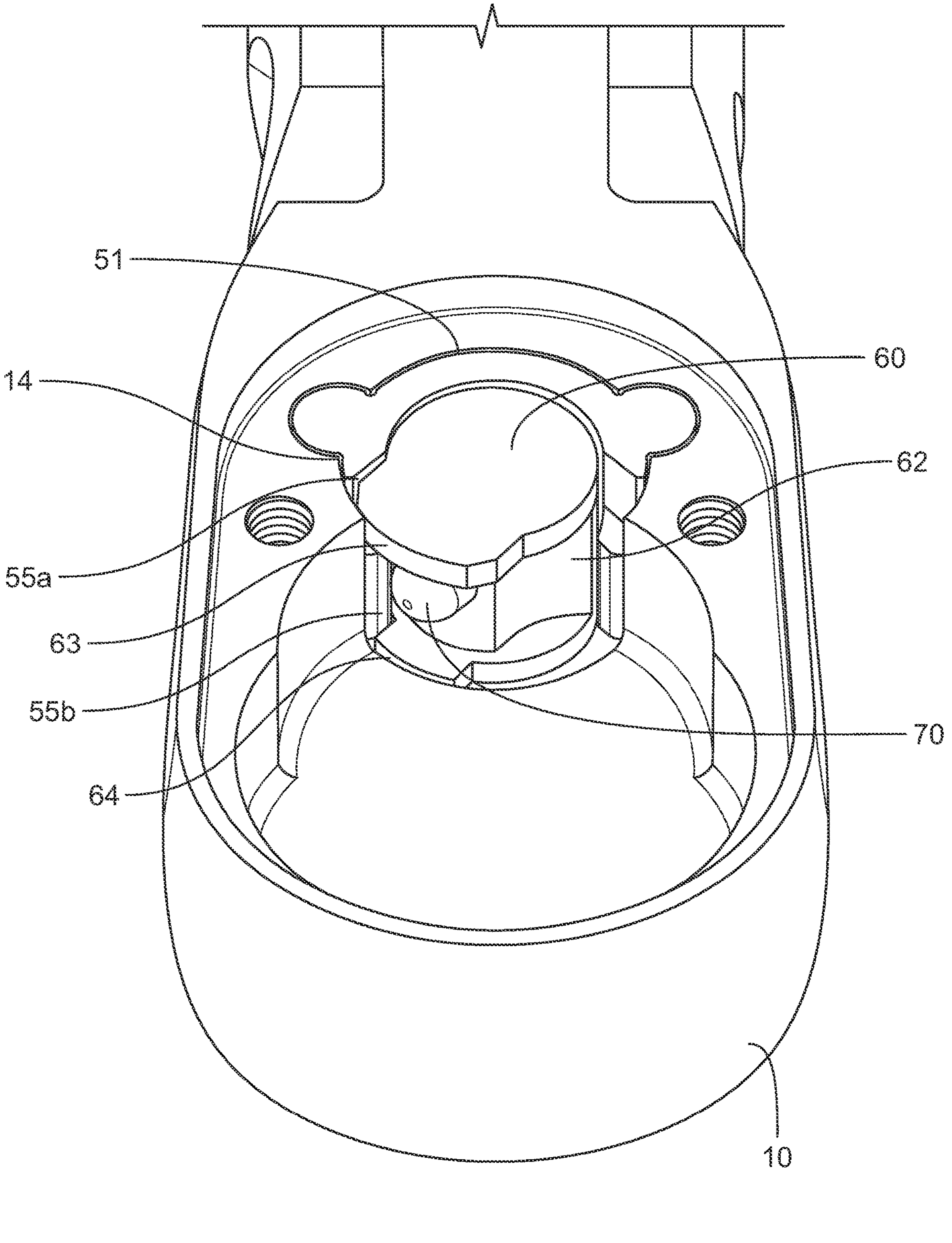
FIG. 12 illustrates a top perspective view of a front side of a ratchet head of a reversible ratchet tool, showing a sleeve, a pin, and a switch in a second position according to another aspect of the present disclosure.

As shown in FIGS. 10-12, the switch 60 includes a switch body 62 and a first ledge 63 that extends away, or laterally, from the central z-axis of the switch body 62. The switch 60 also includes a second ledge 64 that extends away, or laterally, from the central z-axis of the switch body 62. As shown in FIG. 9 and FIG. 10, a portion of the pawl 40 is received between the first ledge 63 and the second ledge 64, thereby limiting movement of the pawl 40 along the z-axis when the switch 60 is rotated in either the first or the second position. Specifically, and as shown in FIG. 10, the first ledge 63 is positioned on one side of the biasing member 71 and the second ledge 64 is positioned on the other side of the biasing member 71.

As discussed above, it is advantageous to provide a stabilized switch that is selectively rotatable between a plurality of discrete orientations such that the switch, and the biasing member disposed within the switch, engages the pawl and the ratchet gear without failure, obstruction, or shifting in position. As shown in FIGS. 6, 9, and 11-12, the sleeve 50 is anchored within the switch-sleeve cavity 14 and includes a first surface 54 (not fully shown in FIG. 9) and a second surface 55 configured to align the switch 60 in a first position and a second position, respectively. In other words, the first surface 54 and second surface 55 of the sleeve 50 constrain the switch 60 to a rotational range, i.e., act as a stop limit for the rotation of the switch 60 when the switch 60 is in the first position (clockwise rotation of the ratchet gear 30) or second position (counter-clockwise rotation of the ratchet gear 30).

In such an embodiment, the biasing member 71 and pin 70 of the switch 60 remains engaged with the pawl 40 and does not contact, interfere with, or rest against any inner surface within the ratchet head 10. When a user engages and rotates the switch lever 61, the switch 60 moves in a rotational range that corresponds to the circumferential shape of the sleeve body 51, as well as the varying geometries of the first surface 54 and the second surface 55 of the sleeve 50.

FIG. 11 illustrates the switch 60 in a first position where further rotation in a counter-clockwise direction is limited due one or more of the first ledge 63 and/or the second ledge 64 contacting at least a portion of the first portion 54 of the sleeve 50. For example, in the illustrated embodiment the first ledge 63 of the switch 60 contacts the first upper portion 54*a* of the sleeve 50 and the second ledge 64 of the switch 60 contacts the first lower portion 54*b* of the sleeve 50 that protrudes beyond the first upper portion 54*a*. FIG. 12 illustrates the switch 60 in a second position where further rotation in a clockwise direction is limited due one or more of the first ledge 63 and/or the second ledge 64 contacting at least a portion of the second portion 55 of the sleeve 50. Again as shown in the illustrated embodiment, the first ledge 63 of the switch 60 contacts the second upper portion 55*a* of the sleeve 50 and the second ledge 64 of the switch 60 contacts the second lower portion 55*b* of the sleeve 50 that protrudes beyond the second upper portion 55*a*. By reducing the reliance on the pawl or biasing member for stabilization of the switch, the switch is free to predictably rotate between the first and second positions while providing reliable pawl-to-gear engagement.

It is noted that the illustrated embodiments depict the first ledge 63 having a first arc length that is greater than a second arc length of the second ledge 64. Such a configuration may be necessary to accommodate the specific geometries of the pawl 40, sleeve 50, and switch 60. It is to be understood that the present disclosure is not limited to this specific configuration and contemplates alternative embodiments in which the first ledge 63 and the second ledge 64 may also have the same arc length or the second arc length of the second ledge 64 is greater than the first arc length of the first ledge 63. Further, the present disclosure contemplates alternative embodiments in which the sleeve 50 has a corresponding geometry to accommodate the various shapes and sizes of the first ledge 63 and second ledge 64 of the switch 60, such that switch is stabilized and further rotation is prevented when the switch is positioned in either the first or second position.

Figure 13:
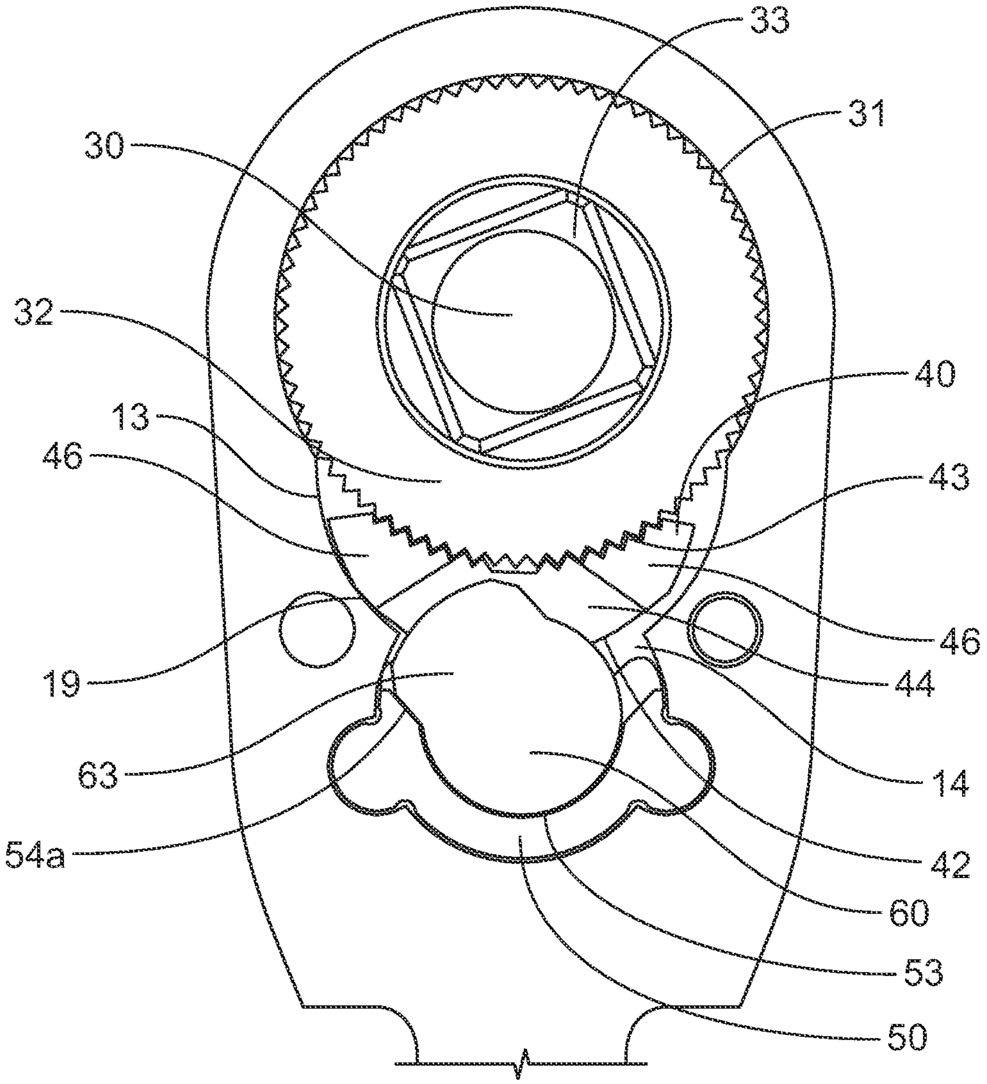
FIG. 13 illustrates a top plan view of an assembled reversible ratchet tool showing a pawl and a switch in a first position according to one aspect of the present disclosure.
Figure 14:
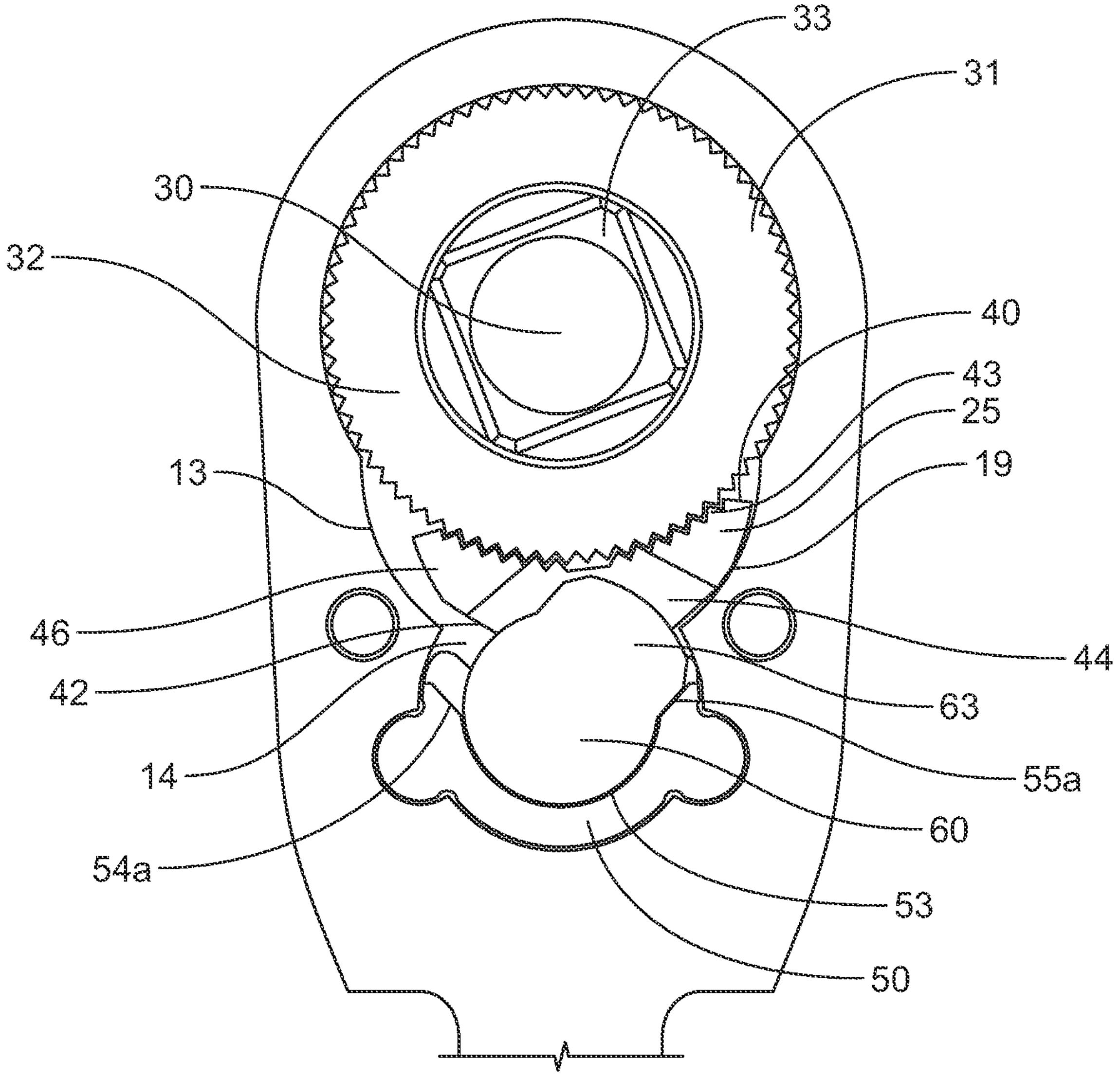
FIG. 14 illustrates a top plan view of an assembled reversible ratchet tool showing a pawl and a switch in a second position according to another aspect of the present disclosure.

FIGS. 10, and 13-14 show the engagement of the switch 60 with the pawl 40 in both the first and second positions. In the illustrated embodiment, first ledge 63 of the switch overlaps the recessed portion 44 of the pawl 40 between the extended portions 46 such that the switch 60 does not rest on, or interfere with, the pawl 40. Therefore, when a user engages the switch 60 in either the first position or second position, the pawl 40 is biased toward the ratchet gear 30 by the pin 70 and biasing member 71 pushing against the notch 45 of the pawl 40. The pawl 40 is therefore wedged between a sidewall 19 of the ratchet assembly cavity 13 and the ratchet gear 30. As such, rotation of the ratchet gear 30 in a clockwise direction (first position) or counter-clockwise direction (second position) is prevented, enabling the transmission of either the clockwise or counter-clockwise rotational force (i.e., torque) through the ratchet head 10, drive member 33, and socket, and onto the work piece.

FIG. 10 further illustrates how the geometries of each of the pawl 40 and switch 60 contribute to stabilizing both the pawl 40 and the switch 60 within the ratchet tool 1. For example in such an embodiment, the switch 60 and the sleeve 50 are disposed on the bottom surface 18 of the switch-sleeve cavity 14 at a depth below the ratchet assembly cavity 13. This allows for the second ledge 64 to sit below the pawl 40 while the first ledge 63 overlaps the recessed portion 44 of the pawl 40. This provides for optimal pawl-to-gear engagement and ensures that the switch 60 does not rely on the pawl 40 or biasing member 71 for stability. The stability of the switch 60 is provided by the sleeve 50 instead of the pawl 40 because the pawl 40 is situated between the first ledge 63 and the second ledge 64 and is able to move from the first position to the second position without interference from the switch 60 or any other internal component. This configuration also limits vertical movement along the z-axis of the pawl 40 and/or rotation of the pawl 40 about the x-axis (as shown in FIG. 1). As discussed above, the top portion 56 of the sleeve 50 and the switch 60 sit flush with the cover plate cavity 11. When the cover plate 80 is attached to the front side 10*a* of the ratchet head 10 and within the cover plate cavity 11, the switch 60 and the sleeve 50 (and, the biasing member 71, pawl 40, and ratchet gear 30), are stabilized in vertical alignment between the bottom surface 18 of the switch-sleeve cavity 14 and the cover plate 80. When torque is applied to a work piece, this arrangement prevents, or limits, vertical movement of the switch 60 and limits the vertical movement of the internal components of the reversible ratchet tool. This arrangement also prevents the switch 60 from inadvertently changing directions, thereby leading to ratchet gear failure.

The assembly of the reversible ratchet tool 1 shown in FIGS. 1, 4-5, and 9 occurs on one side, i.e., the front side 10*a* of the ratchet head 10. In this aspect, the internal components are assembled accordingly: inserting the switch 60 and the biasing member 71 disposed within the switch 60 through the switch aperture 15, anchoring the sleeve 50 to the switch-sleeve cavity 14 via anchors 52 such that the sleeve 50 surrounds the switch 60, placing the pawl 40 between the first ledge 63 and the second ledge 64 of the switch and within the ratchet assembly cavity 13, and positioning the ratchet gear 30 in the ratchet assembly cavity 13 such that it engages with the pawl 40. The present disclosure contemplates that the internal and/or external components may be assembled in a different, or alternative sequence that results in a reversible ratchet tool that permits a user to selectively determine the direction in which torque is applied to a work piece.

Once the internal components are assembled within the front side 10*a* of the ratchet head 10 of the reversible ratchet tool 1, a cover plate 80 is attached within the cover plate cavity 11 of the front side 10*a* of the ratchet head 10. As shown in FIG. 1 and FIG. 9, the cover plate 80 is secured by cover plate screws 81 that are inserted through the cover plate screw holes 82 and threaded into the cover plate cavity screw holes 12. The cover plate 80 also includes screw head counterbores 83 such that the heads of the cover plate screws 81 are seated below an outer surface of the cover plate 80 and do not cause interference with other objects while torque is applied to a work piece. The cover plate 80 further includes an aperture 84, or circular drive member hole, which receives the drive member 33 of the ratchet gear 30 that projects out of the ratchet assembly cavity 13.

The present described technology is now described in such full, clear, concise, and exact terms as to enable any person skilled in the art to which it pertains to practice the same. It is to be understood that the foregoing described preferred aspects of the technology and that modification may be made therein without departing from the spirit of scope of the disclosure as set forth in the appended claims. The scope of the following claims is to be accorded the broadest interpretation to encompass all such modifications and equivalent structures and functions. Therefore, it is intended that the application not be limited to the particular aspects disclosed, but that the application will include all aspects falling within the scope of the appended claims.

What is claimed:

1. A reversible ratchet tool comprising:
- a ratchet head having a front side and a rear side, the ratchet head comprising:
  - a ratchet assembly cavity;
  - a switch-sleeve cavity that overlaps with the ratchet assembly cavity;
  - a switch aperture extending from the ratchet head rear side to the switch- sleeve cavity;
  - a ratchet assembly disposed in the ratchet assembly cavity, the ratchet assembly comprising:
    - a ratchet gear including a drive member for transmitting torque to a work piece, and
    - a pawl operable to selectively engage with the ratchet gear;
  - a sleeve disposed in the switch-sleeve cavity, comprising:

a sleeve body, and
a switch pocket,
wherein the sleeve and the switch-sleeve cavity are configured to prevent rotation of the sleeve within the switch-sleeve cavity;
a switch rotatably disposed through the switch aperture and within the switch pocket of the sleeve, the switch comprising:
a switch body;
a first ledge extending away from the switch body on one side of the biasing member, wherein the first ledge has a first are length; and
a second ledge extending away from the switch body on an opposite side of the biasing member, wherein the second ledge has a second arc length:
wherein the sleeve further comprises:
a first surface operable to engage with either the first ledge or the second ledge of the switch to align the switch in a first position; and
a second surface operable to engage with either the first ledge or the second ledge of the switch to align the switch in a second position;
wherein the switch includes a biasing member operable to engage the pawl such that the biasing member urges the pawl against the ratchet gear; and
a cover plate attachable to the front side of the ratchet head for closing the ratchet assembly cavity and switch-sleeve cavity.

2. The reversible ratchet tool of claim 1, wherein at least one anchor protrudes from the sleeve body and is operable to engage with at least one anchor pocket disposed within the switch-sleeve cavity such that the sleeve is anchored to the ratchet head.

3. The reversible ratchet tool of claim 1, wherein the biasing member comprises a spring and a pin, the spring and pin being at least partially disposed within the switch.

4. The reversible ratchet tool of claim 1, wherein the pawl comprises a front surface and a rear surface, and the front surface includes a plurality of pawl teeth operable to selectively engage with the ratchet gear.

5. The reversible ratchet tool of claim 4, wherein the rear surface of the pawl includes a recessed portion, and the recessed portion provides a space to allow rotation of the switch.

6. The reversible ratchet tool of claim 1, wherein the first arc length of the first ledge is greater than the second arc length of the second ledge.

7. The reversible ratchet tool of claim 1, wherein the pawl is at least partially disposed between the first ledge and the second ledge of the switch to limit vertical movement of the pawl relative to the front side and the rear side of the ratchet head.

8. The reversible ratchet tool of claim 1, the cover plate further comprising an aperture operable to receive the drive member of the ratchet gear projecting out of the ratchet assembly cavity.

9. A reversible ratchet tool comprising:
a ratchet head having a front side and a rear side, the ratchet head comprising:
a ratchet assembly cavity having a first depth relative to the front side of the ratchet head;
a switch-sleeve cavity that overlaps with the ratchet assembly cavity, wherein:
the switch-sleeve cavity has a second depth relative to the front side of the ratchet head;
the second depth is greater than the first depth; and
the switch-sleeve cavity includes a bottom surface positioned proximate the rear side of the ratchet head;
a switch aperture that extends from the ratchet head rear side to the switch- sleeve cavity;
a ratchet assembly disposed in the ratchet assembly cavity, the ratchet assembly comprising:
a ratchet gear including a drive member for transmitting torque to a work piece, and
a pawl operable to selectively engage with the ratchet gear;
a sleeve disposed in the switch-sleeve cavity, comprising:
a sleeve body, and
a switch pocket;
a switch, comprising a switch body and at least one ledge, rotatably disposed through the switch aperture and within the switch pocket, wherein a rotation of the switch is constrained to a rotational range by the sleeve;
a biasing member at least partially disposed within the switch and operable to engage the pawl such that the biasing member urges the pawl against the ratchet gear;
wherein the at least one ledge extends away from the switch body on one side of the biasing member;
wherein the pawl is at least partially disposed between the at least one ledge and a bottom surface of the ratchet assembly cavity to limit vertical movement of the pawl relative to the front side and the rear side of the ratchet head;
the sleeve further comprising:
a first surface operable to engage with the at least one ledge of the switch to align the switch in a first position; and
a second surface operable to engage with the at least one ledge of the switch to align the switch in a second position;
a cover plate attachable to the front side of the ratchet head for closing the ratchet assembly cavity and switch-sleeve cavity, wherein the cover plate and the bottom surface of the switch-sleeve cavity maintain a vertical alignment of the switch relative to the front side and the rear side of the ratchet head.

10. The reversible ratchet tool of claim 9, wherein at least one anchor protrudes from the sleeve body and is operable to engage with at least one anchor pocket disposed within the switch sleeve cavity such that the sleeve is anchored to the ratchet head.

11. The reversible ratchet tool of claim 9, wherein the pawl comprises a front surface and a rear surface, and the front surface includes a plurality of pawl teeth operable to selectively engage with the ratchet gear.

12. The reversible ratchet tool of claim 11, wherein the rear surface of the pawl includes a recessed portion, and the recessed portion provides a space to allow rotation of the switch.

* * * * *